June 28, 1949.　　　　R. C. ZEIDLER　　　　2,474,298
FLUID WHEEL
Filed Sept. 11, 1944　　　　　　　　　　　3 Sheets-Sheet 1
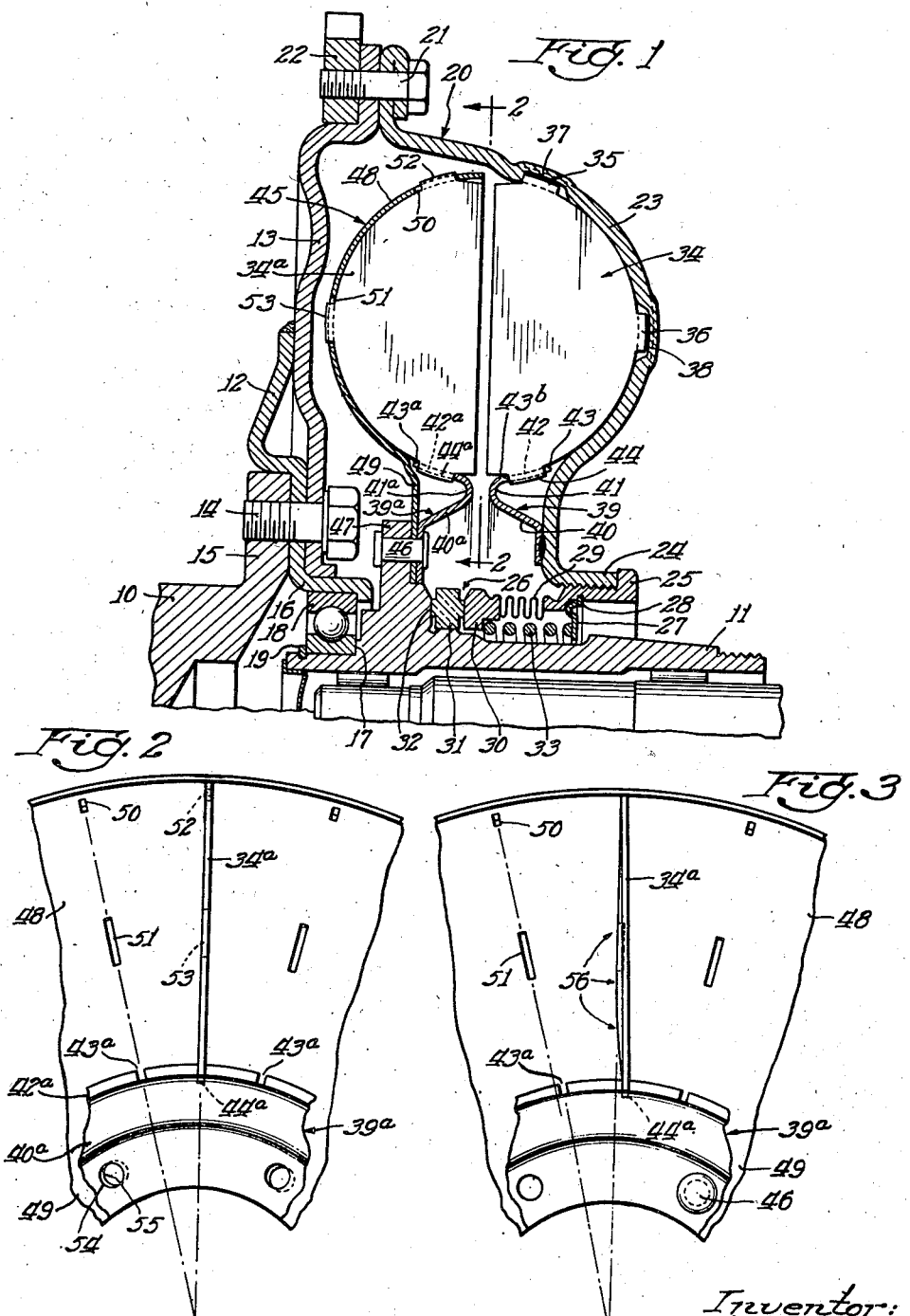
Inventor:
Reinhold C. Zeidler

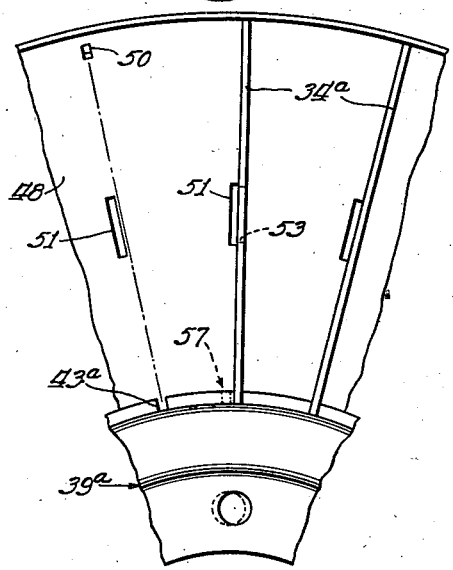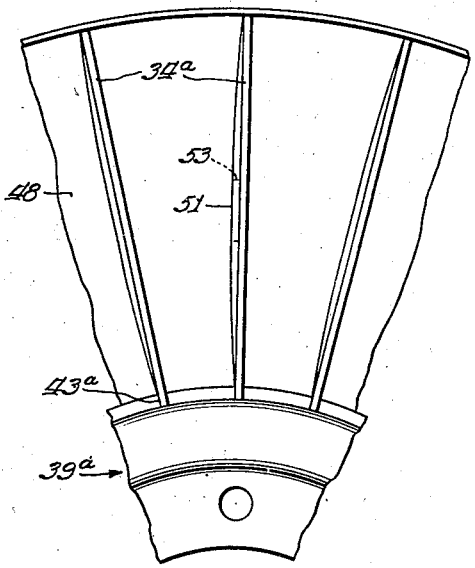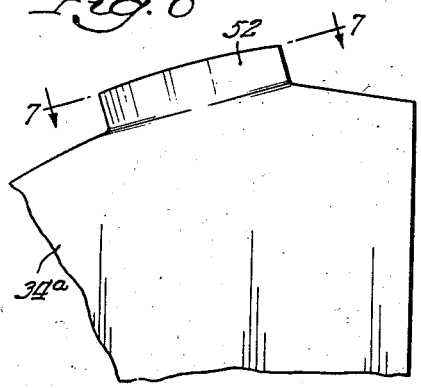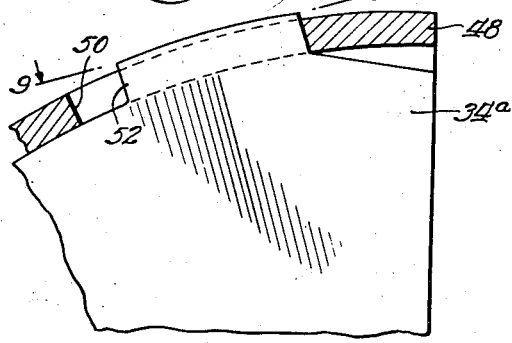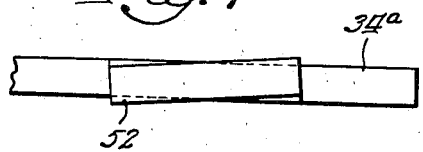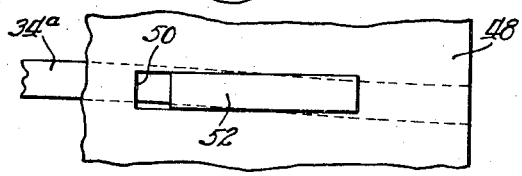

June 28, 1949.
R. C. ZEIDLER
2,474,298
FLUID WHEEL
Filed Sept. 11, 1944
3 Sheets-Sheet 3
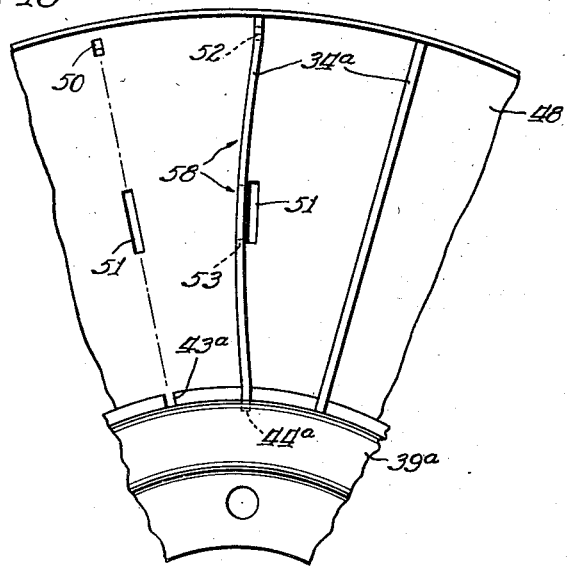
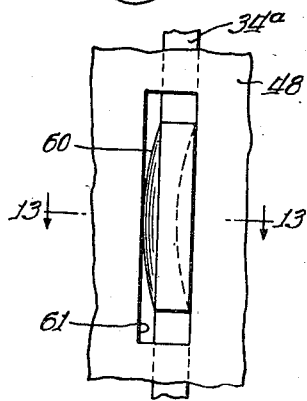
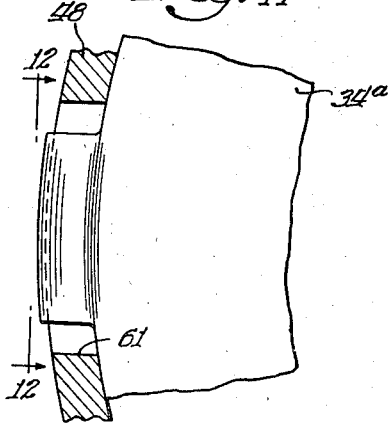
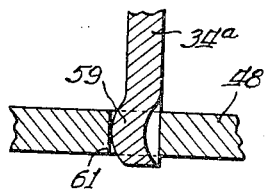
Inventor:
Reinhold C. Zeidler
By Edward C. Fritzbaugh
Atty.

Patented June 28, 1949

2,474,298

UNITED STATES PATENT OFFICE 2,474,298

FLUID WHEEL

Reinhold C. Zeidler, Detroit, Mich., assignor to Borg-Warner Corporation, Chicago, Ill., a corporation of Illinois Application September 11, 1944, Serial No. 553,525

20 Claims. (Cl. 103—115)

My present invention relates to a vaned fluid coupling member of the type of device shown in my copending application Serial No. 523,258, filed February 21, 1944, now Patent No. 2,429,503 of October 21, 1947, and more particularly to means for mounting the vanes thereof whereby vibrations or rattle of the vanes during operation of the device is effectively overcome.

It is one of the principal objects of this invention to simplify the construction of a fluid coupling member such as contemplated herein, and to improve the efficiency, operation and dependability of such coupling member.

Another principal object hereof is to provide simple holding means for anchoring the vanes or blades in the torus shaped shell or housing of a fluid coupling member, said means being adapted to eliminate the employment of means such as welding, brazing, bolts, rivets and the like, which require special methods of operation and special machinery for performing these operations, all of which frequently involves considerable expense for both installation and operation.

A further principal object hereof resides in providing vane or blade mounting means whereby a portion of a yieldable or flexible plate, forming the vane, is warped or flexed out of its normal shape so that the reflex action induced in the yieldable material by reason of such warping, is adapted to maintain the vane against rattle in the seat or other coacting means on the supporting shell or housing. This may be accomplished by providing a series of radially aligned seats for the margin of the shell and after the blade has been seated in one of the seats said blade is moved annularly of the shell carrying the blade thereby bodily distorting the blade to hold it in position. A further manner of accomplishing this end is to offset one of a series of seats so that the body of the blade must be bulged or otherwise distorted in order to insert the blade in the offset seat. Another manner is to bend a portion of the vane whereby it is necessary to distort it to mount it.

It is still another object hereof to provide the vanes with tabs that preferably project from its marginal portion, one or more of such tabs being normally twisted or distorted out of the plane of the blade so that upon insertion into suitable holding means or seats, a portion of the yieldable plate forming the vane must be warped in a direction opposing the twist or distortion of the tab, thus firmly anchoring the vane in its seat or seats to prevent rattle.

A still further object of this invention resides in providing a vane that is initially bulged or bowed so that it must be distorted out of such initial shape when the tabs on its margin are entered in seating means on the adjacent portion of the shell.

Still another object hereof is to provide a flexible vane with one or more tabs at its margin, one or all of the tabs being crowned or bulged out of the plane of the blade. This requires the crowned or bulged tab (which is an integral part of the vane), to be distorted by flattening the crown or bulge when the tabs are inserted into seating means having restricted dimensions.

Additional objects, aims and advantages of the invention contemplated herein will be apparent to persons skilled in the art after the construction and operation of the fluid coupling member is understood from the within description. It is preferred to accomplish the numerous objects of this invention and to practice the same in substantially the manner hereinafter fully described and as more particularly pointed out in the appended claims.

Reference is now made to the accompanying drawings that form a part of this specification, in which:

Fig. 1 is an axial section of a fragmentary portion, preferably one-half of a fluid coupling structure, showing the present invention thereon.

Fig. 2 is a transverse sectional view along the plane of line 2—2 on Fig. 1, showing a blade or vane in position prior to being warped or distorted.

Fig. 3 is a view similar to Fig. 2 showing the assembly after the blade has been bodily warped or distorted.

Fig. 4 is a view showing a modified structure wherein at least one of the radially disposed seats on the shell is misaligned or offset with respect to the other seats.

Fig. 5 illustrates the distorting or warping of the blade shown in Fig. 4, after the assembly has been completed.

Fig. 6 is an enlarged view of a portion of a modified blade wherein a part of the blade, preferably a tab or lug, has been initially skewed or twisted bodily with respect to the plane of the blade.

Fig. 7 is an edge view of the structure shown in Fig. 6, the view being taken along the plane of line 7—7 on Fig. 6.

Fig. 8 is a view showing a modified blade, such as illustrated in Figs. 6 and 7, in position in its seat.

Fig. 9 is a plan taken along the plane of line 9—9 on Fig. 8.

Fig. 10 is a view similar to Fig. 4 showing another modified structure wherein the body of the blade is formed with a crown or bulge that is adapted to be somewhat straightened or flattened when the margin of the blade is mounted in its seating means.

Fig. 11 is an enlarged view showing a modified form wherein a tab or lug at the margin of the blade is crowned and bowed.

Fig. 12 is a plan of the modified structure shown in Fig. 11, the view being on the plane of line 12—12 thereon.

Fig. 13 is a transverse section along the plane of line 13—13 on Fig. 12.

The drawings are to be understood as being more or less of a schematic character for the purpose of disclosing a typical or preferred form of the improvements contemplated herein, and in these drawings like reference characters identify the same parts in different views.

The structure shown in Fig. 1 illustrates a fluid coupling structure that comprises a driving shaft 10 and a driven shaft 11. Annular members 12 and 13 are secured to drive shaft 10 by means of bolts 14 that pass through said members and screw into a lateral flange 15 on the drive shaft. Preferably, the annular members 12 and 13 are secured together by means of welding or the like as shown in Fig. 1. The annular member 12 is formed with an inwardly turned flange 16 and the adjacent portion of the driven shaft 11 is formed with a shoulder 17. An anti-friction bearing 18, that is interposed between this flange and shoulder, is held in place by means of a split retainer ring 19. In this manner the driven shaft 11 is effectively piloted with respect to the drive shaft 10.

The driving impeller member 20 of the fluid coupling has an outer flanged portion that is secured to the annular member 13 by bolts 21 that pass through these portions and are screwed into a ring gear 22. The driving member 20 of the coupling comprises a hollow shell portion 23 of approximately semi-circular cross section to provide an inner concave face and it has an internally threaded hub portion 24. A threaded collar 25 is screwed into this hub 24 and a suitable fluid seal 26 is provided between the collar 25 and the driven shaft 11 to prevent leakage.

The seal comprises a washer ring 27 fixed against a shoulder on the inner portion of the collar 25 and retained in position by a snap ring 28. A flexible metal diaphragm 29, fixed on the inner portion of the collar 25, is secured to the seal ring 30 that bears against the adjacent surface of a second seal ring 31 having face engagement with the flat radial surface 32 of an adjacent portion of driven shaft 11. A compressed coiled spring 33 is seated at one end against the metal ring 27 that acts as a stop plate therefor, and at its other end this spring is engaged against the seal ring 30 to urge the parts of the seal assembly 26 into intimate surface contact with each other. It will be seen that the driving shaft 10, the annular members 12 and 13, the impeller element 20, and the cylindrical collar 25 comprise a suitable housing or casing that is adapted to receive fluid, and the seal assembly 26 completes this housing or casing and renders it leak-proof.

A plurality of metal blades or vanes 34, each having a substantially semi-circular outer margin and a straight inner margin, are disposed in the concave portion of the shell member 23. Each of these vanes 34 has projections or tabs 35 and 36 that fit into suitable holding means or seats 37 and 38 respectively that are disposed in circumferentially spaced rows around the shell portion 23. The holding means for the blades that are herein called seats may be slots, recesses, lugs, notches and the like. The seats 37 are adjacent and spaced from the radially outer edge of the shell portion 23, while the seats 38 are substantially intermediate the outer and inner edges of this shell portion.

An annular member 39, adapted to lock the vanes in place after they have been inserted in housing, is preferably welded to the inner surface of the hub portion 24 so that it forms a portion of the shell 23. Said annular member has an oblique portion 40 extending inward away from the hub and it has a reverse bend 41 that disposes its remaining free portion 42 in a position so that it extends back towards the shell 23 adjacent the juncture between said shell and its hub 24 in the manner shown in Fig. 1. This remaining portion 42 of the annular member 39 has transversely disposed seats 43 that open through its free edge and are adapted to receive projections or tabs 44 on the adjacent portion of the vanes or blades 34 that are opposite the tabs or projections 35. The inner ends of the seats 43 provide abutments or stops 43b against which the adjacent transverse or end edges of the lugs or projections 44 will engage. The slotted free portion 42 of annular member 39 is of a yielding character and when the blades 34 are inserted into the concave portions of the shell 23 the tabs or lugs 44 of the vanes are adapted to be sprung into place in these seats 43 after the other tabs or projections 35 and 36 have been inserted into their respective seats 37 and 38. With each of the vanes or blades mounted in this manner, the vanes, due to the pressure exerted by the annular member 39, will be tightly held in place and will be maintained against sidewise movement in the hollow shell 23 to prevent rattling.

The driven member of the fluid coupling, identified generally as 45, is disposed within the fluid container formed by the power driven element 20 and the annular members 12 and 13, and it is secured by means of screws or rivets 46 to a lateral flange 47 on the adjacent portion of the driven shaft 11. This driven element is a hollow shell 48 of approximately semi-circular shape in cross section and it has a hub portion 49 extending from its shell portion. The shell portion 48 is provided with circumferentially spaced seats 50 adjacent its radially outer edge and has other circumferentially spaced seats 51 intermediate its radially inner and outer edges. A plurality of vanes 34a, identical with those mounted on impeller element 23, fit into the concave portion of the shell 45 and have projections or lugs 52 and 53 that are inserted in seats or recesses 50 and 51 in the shell 48.

A vane retainer element 39a of annular shape has parts 40a, 41a and 43a corresponding with the similar parts on the annular retainer element 39 before described and this retainer element 39a is secured to the hub 49 of the driven shell 45 by means of the rivets 46 that anchor the shell hub 49 to the flange 47 of the driven shaft 11. Thus the annular retainer member 39a functions in a manner similar to the other retainer member 39 which holds the vanes 34 in position. The rows of recesses or slots 50 and 51 on the shell and the recesses or slots 43a on the retainer ring 39a provide seating means for the marginal portions of the vanes 34a that are inserted therein.

Figs. 2 and 3 diagrammatically illustrate one manner of mounting a blade or vane to prevent vibration or rattle thereof in its seating means. In Fig. 2 it will be seen that the seats 50 and 51 of the shell and the recesses of the annular retainer member 39a are initially in radial alignment with each other. Also the rivet holes 54 in the annular retainer 39a are misaligned or offset to the left with respect to the holes 55 in the shell hub 49. After the tabs 52 and 53 have been inserted in seats 50 and 51, the tabs 44a are inserted in the seats 43a of the retainer 39a, and thereafter the retainer 39a is bodily rotated in a clockwise direction to bring holes 54 into registration with holes 55 for receiving the rivets 46 therethrough. This bodily rotative movement of the retainer member 39a will warp, or flex or distort the body of the blade 34a in a bulge or bow as indicated by arrows 56 in Fig. 3. This warping or distortion produces a tension on the blade and the reflex action of the yieldable material, that is induced by the warping or distortion of the blade, is effective to urge or press the tabs firmly against the walls of their respective seats, thus preventing any vibratory movement that would tend to produce a rattle between the engaged surfaces of the metal parts.

In Figs. 4 to 9 there are shown modified arrangements whereby the vanes or blades are distorted or flexed to effect a firm, vibrationless fit between the vane tabs and their respective seating means, whereby to eliminate rattle during the operation of the fluid coupling.

It will be seen by reference to Fig. 7 that the tab 52 has been twisted or skewed around a suitable distance. When the twisted tab 52 has been inserted in its seat 50 the blade will be in a position so that the blade proper will have to be warped or distorted in order to engage the other tabs in their respective seats. Fig. 8 shows the tab 52 after its insertion in its seat 50, and Fig. 9 shows the tab fitting the seat and the body of the blade distorted, the drawing being exaggerated to better illustrate the assembly.

In Fig. 4, the seat 43a in retainer 39a and the seat 50 in the shell are radially aligned, while the intermediate seat 51 is misaligned by offsetting it to the left of the radial plane passing through the two other seats. After entering the tabs in seats 43a and 50, the annular retainer 39a is backed up to position its seat 43a at the dotted location indicated by arrow 57 (Fig. 4) and after the intermediate tab 53 has been inserted in its seat 51 the retainer is rotated clockwise to return it to its anchoring position with holes 54 and 55 registered to receive rivets 46. This will warp or distort the vane 34a as shown in Fig. 5 somewhat similar to the disclosure in Fig. 3.

Fig. 10 shows a vane that is formed with a crowned or bulged portion 58 to provide a vane having initially concavo-convex shape in cross section, and in this arrangement the seating means are all in radial alignment. When this vane is being mounted in the shell the upper and lower tabs 52 and 44a are inserted in their respective seats, and as seen in the central portion of Fig. 10 the intermediate tab 53 is disposed in offset relation to its seat 51. By pressing the portion of the vane adjacent tab 53 to the right, in Fig. 10, this tab may be entered in its seat 51 and the distortion of the initially bulged vane will tend to flatten the bulge so that said vane will be straightened as shown at the right in Fig. 10. By distorting the normally crowned or bulged vane back to a flat plane the lugs are all held in their seats and there will be sufficient tension to prevent vibratory movement or rattle of the structure during operation.

Figs. 11, 12 and 13 show a modified structure for preventing rattling of the vanes in their seating means, wherein a tab or extension is provided with a crowned region 59 as shown in section in Fig. 13. In Fig. 12 it will be seen that the crowned portion of a tab is also bowed as at 60 throughout its length. By reason of this arrangement, when the tab is entered into seat 61, the bowed and crowned portions will have to be distorted out of their original shape so that the corners at the ends of a tab will engage a side wall of the seat while the bulged and crowned portion will engage the opposite longitudinal wall of the seat intermediate the ends of the latter. Thus the tab is distorted and held under sufficient tension in the seat to prevent vibration or rattle. In a structure of this character it is preferred that all of the tabs on each blade be constructed and arranged in the manner shown in Figs. 11 to 13 so that the entire vane is held against vibratory movement during operation.

It is to be understood that the expressions such as "seating means" or "seats" in the claims are intended to define slots, recesses, notches, lugs and the like.

While this invention has been described in detail in its present, preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A wheel for a fluid coupling comprising a rotatable shell having blade seating means, and a blade mounted in said means, said blade comprising a flexible normally flat plate, and integral tabs on a margin of said plate, one of said tabs being preformed by being bodily skewed out of alignment with the plate, the reflex action induced by warping the skewed tab in its seat securely anchoring the plate and preventing vibratory movement thereof.

2. A wheel for a fluid coupling comprising a rotatable shell, and a blade carried thereby, said blade comprising a flexible plate at least a portion of which is crowned, the reflex action induced by warping the crowned portion of the plate securely anchoring the plate and preventing vibratory movement thereof.

3. In combination with the rotatable shell of a fluid coupling member having a plurality of elongated seats arranged in approximately radial alignment with the axis of said shell; a radially positioned blade adapted for vibrationless mounting in said seats comprising a yieldable plate having a plurality of tabs on its margin entered in said seats, said tabs and seats being so constructed and arranged that at least a portion of the blade is warped out of its normal shape in a direction transverse to its thickness, whereby reflex action induced in the yieldable plate by the warping of the blade maintains said tabs against vibration in said seats during operation of the coupling member.

4. A fluid coupling member comprising a shell having a semi-toroid concave inner face; a plurality of rows of radially arranged seats on said face; radial vanes each comprising a yieldable blade having a normally flat body portion and arranged with marginal portions engaged in said seats; and an annular retainer member secured to said shell having a row of seats engaged with other marginal portions of said vanes; the seats in one of said rows disposed in offset relation to the seats in the other rows whereby each blade is warped out of the normal plane of its plate and in the direction of the thickness of said plate, thereby inducing reflex actions in said blades for preventing vibration of the seated portions of said blades.

5. A fluid coupling member comprising a shell having a concave inner face; a plurality of spaced rows of radially aligned seats on said face; yieldable radial vanes each comprising a plate arranged with marginal portions engaged in radially aligned seats; an annular retainer member having a row of seats initially disposed in the radial planes of the aligned seats on said shell; and means for anchoring said annular member on said shell to offset the annular member seats out of the planes of the shell seats for warping portions of said vanes.

6. A fluid coupling member comprising a shell having a concave inner face; a plurality of spaced rows of radially aligned seats on said face; yieldable radial vanes each comprising an initially bulged plate arranged with marginal portions engaged in radially aligned seats in said shell; and an annular retainer member anchored to said shell and having a row of seats engaged with marginal portions of said vanes, the arrangement of said retainer member seats with respect to the seats on said shell being adapted to straighten the bulged vanes and induce reflex action therein for preventing vibration of the vanes in their seats.

7. A fluid coupling member comprising a shell having a concave inner face; a plurality of spaced rows of radially aligned seats on said face; and radial vanes extending transverse to said face, each vane comprising a yieldable plate having a convex margin fitting said concave face; and tabs projecting from said margin, at least one of said tabs being preformed into a bodily skewed position transverse to the plane of the body of said plate whereby a bodily distortion of the vane is effected by the insertion of the tabs in their respective seats.

8. A fluid coupling member comprising a shell having a concave inner face; a plurality of spaced rows of radially aligned seats on said face; and radial vanes extending transverse to said face, each vane comprising a yieldable plate having a convex margin fitting said concave face; and tabs projecting from said margin, said tabs having a crowned formation extending laterally beyond the plane of said plate, said crowned formation being flattened by insertion in said seats thereby to press the faces of said tabs against opposite walls of said seats for preventing vibratory movement of the tabs in their respective seats.

9. A fluid coupling member comprising a shell having a concave inner face; a plurality of radially aligned circumferentially spaced rows of radially aligned elongated recesses on said face; radial vanes in said shell, each vane comprising a yieldable plate; and elongated tabs projecting from said plate and seated in said radially aligned recesses, said tabs having crowned form and having a longitudinal bulge, the crown and bulge projecting laterally beyond the plane of a surface of said yieldable plate and compressed between opposing walls of said recesses for maintaining said tabs against vibratory movement relative to the walls of said recesses.

10. A blade for a fluid coupling member that is adapted for vibrationless mounting in a rotatable shell having seating means arranged approximately radial to the shell axis, comprising a plate of yieldable material; and tabs projecting from a margin of said plate for entry in said seats, at least one of said tabs being preformed by being bodily skewed to dispose said tab oblique to the plane of said plate.

11. A blade for a fluid coupling member that is adapted for vibrationless mounting in a rotatable shell having seating means arranged approximately radial to the shell axis, comprising a plate of yieldable material; and tabs projecting from a margin of said plate for entry in said seats, said tabs having a crowned form and having a longitudinal bulge that are adapted to be compressed between opposite walls of the seating means on the shell.

12. A fluid coupling member comprising a shell; a vane carried by said shell; and means cooperating with marginal portions of said vane for retaining said vane seated in said shell, said vane portions and said retaining means being so constructed and arranged that said vane is bodily distorted in the direction of its thickness.

13. A fluid coupling member comprising a shell; a vane carried by said shell; and means associated with said shell cooperating with marginal portions of said vane for retaining said vane seated in said shell, the construction and arrangement of said vane portions and said retaining means being such that at least a portion of said vane is bodily distorted in the direction of its thickness.

14. A fluid coupling member comprising a shell; a plurality of yieldable sheet metal plates defining vanes carried by said shell; and a plurality of means associated with said shell cooperating with marginal members on said vanes for retaining said vanes seated in said shell, the construction and arrangement of said marginal members and said retaining means being such that said vanes are bodily flexed in the direction of the thickness of said plates.

15. A fluid coupling member comprising a shell; a plurality of yieldable sheet metal plates defining vanes carried by said shell; seating means on said shell cooperating with marginal portions of said vanes; an annular member mounted on said shell having seating means cooperating with other marginal portions of said vanes; the construction and arrangement of both said marginal vane portions and both said seating means being such that said vanes are bodily flexed each in the direction of its thickness.

16. A fluid coupling member comprising a hub; a flexible vane; and a vane-supporting structure carried by said hub and mounting said vane outwardly of said hub, said vane-supporting structure having means arranged and constructed to cooperate with said vane to maintain the body of said vane flexed in the direction of its thickness for inducing a reactionary force in said flexed vane which is effective to hold said vane in engagement with said vane-supporting structure.

17. In a vaned element of a fluid coupling, a carrier; a flexible vane; and a vane-supporting structure connected to said carrier and having spaced portions engaging spaced portions of said vane arranged to maintain the body of said vane flexed in the direction of its thickness, the reflex action induced in said vane by the aforesaid flexing thereof being effective to hold said spaced vane portions in engagement with said spaced portions of said supporting structure.

18. In a fluid coupling element, the combination of a hollow, substantially semi-toroidal casing having a seat; a flexible vane in said casing and having a substantially semi-circular outer margin proximate the inner surface of said casing; a tab on the margin of said vane engaging said seat; and a member carried by said casing and exerting force on said flexible vane to flex said vane in the direction of its thickness, whereby the reaction force in said flexed vane is effective to hold said tab in engagement with said seat and said vane in engagement with said member.

19. In a fluid coupling member, the combination of a substantially semi-toroidal shell having a plurality of circumferentially spaced notches in the inner surface thereof and passing only partially through the wall of said shell; a plurality of flexible vanes fitting in said shell; tab means on each vane fitting in one of said notches; and an annular member fixed with respect to said shell and exerting pressure on said vanes to urge said tab means into engagement with the ends of said notches farthest from said annular member, thereby to flex the body of each vane in the direction of its thickness, the reflex action of each flexed vane being effective to hold itself in engagement with said annular member and its tab means in engagement with its respective notch.

20. A fluid coupling member comprising a hub; a vane-supporting structure carried by said hub; a flexible vane; and means on said vane arranged and constructed to cooperate with said vane-supporting structure to maintain the body of said vane flexed in the direction of its thickness for inducing a reactionary force in said flexed vane which is effective to hold said vane in engagement with said vane-supporting structure.

REINHOLD C. ZEIDLER.

REFERENCES CITED

The following references are of record in the file of this patent:

UNITED STATES PATENTS

| Number | Name | Date |
| --- | --- | --- |
| 1,469,086 | Henderson | Sept. 25, 1923 |
| 1,602,009 | Germeyer | Oct. 5, 1926 |
| 1,637,652 | Ness | Aug. 2, 1927 |
| 1,916,175 | Lysholm et al. | June 27, 1933 |
| 2,203,958 | Greenlee et al. | June 11, 1940 |
| 2,317,217 | Pennington | Apr. 20, 1943 |
| 2,328,393 | Neracher et al. | Aug. 31, 1943 |
| 2,357,618 | Swift | Sept. 5, 1944 |
| 2,360,440 | Muller et al. | Oct. 17, 1944 |

FOREIGN PATENTS

| Number | Country | Date |
| --- | --- | --- |
| 165,432 | Germany | Nov. 17, 1905 |